United States Patent [19]
Belot et al.

[11] Patent Number: 4,698,218
[45] Date of Patent: Oct. 6, 1987

[54] PROCESS AND THE APPARATUS FOR THE PRODUCTION OF SILICON HYDRIDES

[75] Inventors: Dominique Belot, Le Chesnay; Jean-Yves Rade, both of Le Chesnay; Jean-Francois Piffard, Suresnes; Christian Larquet, Guyancourt; Philippe Cornut, La Celle-Saint-Cloud, all of France

[73] Assignee: L'Air Liquide, Societe Anonyme pour l'Etude et l'Exploitation des Procedes Georges Claude, Paris, France

[21] Appl. No.: 683,475

[22] Filed: Dec. 19, 1984

[30] Foreign Application Priority Data

Dec. 19, 1983 [FR] France ................. 83 20267

[51] Int. Cl.$^4$ ............................ C01B 33/04
[52] U.S. Cl. ................................ 423/347
[58] Field of Search ....................... 423/347

[56] References Cited

U.S. PATENT DOCUMENTS

| 2,551,571 | 5/1951 | Culbertson | 423/347 |
| 2,915,368 | 12/1959 | Lorenz et al. | 423/347 |
| 3,577,220 | 5/1971 | Kuratomi et al. | 423/347 |

FOREIGN PATENT DOCUMENTS 498256 12/1953 Canada ................. 423/347

*Primary Examiner*—John P. Sheehan
*Attorney, Agent, or Firm*—Browdy and Neimark

[57] ABSTRACT

Silicon hydrides are produced by acid hydrolysis of ternary silicon alloys. According to the process there are made to react an industrial ternary alloy of the formula $M_x M^2_y Si_z$, in which $M^1$ is a reducing metal, $M^2$ is an alkali alkaline-earth metal, with a dilute acid selected from hydracids and orthophosphoric acid, at a concentration of 2N to 6N, by adding the ternary alloy in the form of fine powder to the acid, the reaction being preformed between ambient temperature and 90° C. The various hydrides are condensed, and separated by fractional evaporation under partial vacuum. The silicon hydrides—silane, disilane and higher polysilanes—after purification can be used as silicon vectors, depending on their chemical nature, particularly in the industries of electronic components, photovolaitic cells, photocopier drums and for frosting light bulbs by the dry method.

14 Claims, 1 Drawing Figure

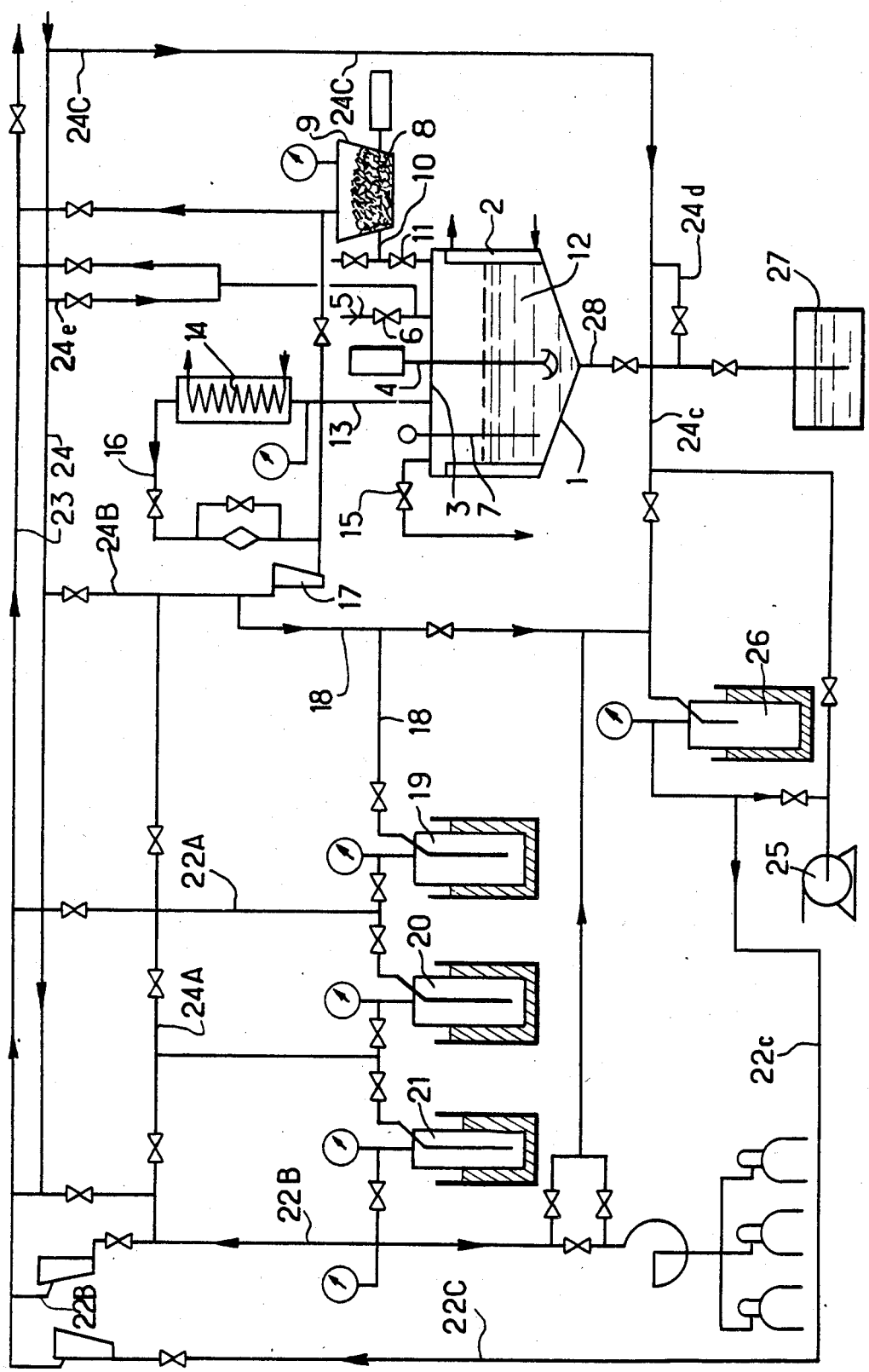

PROCESS AND THE APPARATUS FOR THE PRODUCTION OF SILICON HYDRIDES

FIELD OF INVENTION

This invention relates to the production of silicon hydrides by acid hydrolysis of ternary silicon alloys.

BACKGROUND

Silane (or monosilane or silicon tetrahydride: $SiH_4$) is used mainly as a silicon vector in providing deposits from the vapor phase. For the production of semiconductors, particularly in the VLSI (Very Large Scale Integration) techniques, deposits of polycrystalline silicon, silica, silicon nitride are made by using silane as the silicon vector.

Thin-layer deposits of polycrystalline silicon, obtained from silane, make it possible to produce solar batteries having an energy output greater than 6%. It is possible to obtain coatings, which are resistant to corrosion by acids, on metals by cracking of silane. Finally, silane can be added to multiple bonds of unsturated hydrocarbons to yield organosilanes.

Numerous methods of synthesis of silane have been proposed but only three seem to have had an industrial development. The molten salt method consists of reducing a chlorosilane by lithium hydride, at a temperature on the order of 450° C., in a molten bath of lithium chloride-potassium chloride. This technique offers the advantage of directly producing silane of good purity; on the other hand, it has the disadvantage of high cost and of handling molten salts that is generally not easy. A variant of this technique was envisaged by Sundemeyer, Glemser Angew. Chem. 70, p. 625 (1958). It consists in electrolyzing lithium chloride in situ to produce lithium which is transformed into lithium hydride by introduction of hydrogen into the reactor. This process has not been worked industrially, mainly because of technological difficulties.

According to the method utilizing reduction of silicon chloride by lithium aluminum hydride, the reaction is performed in the vicinity of ambient temperature in a heavy solvent such as diglyme or tetraglyme. This production process is no longer used because of its much too high cost and because of the degradation of the solvent, which strongly pollutes the silane by hydrocarbons, and which therefore requires a thorough purification of the product.

In the method of hydrolysis of silicon alloys, various binary alloys have been considered such as CaSi, $CaSi_2$, MgSi and $Mg_2Si$. According to E. Wiberg, Hydrides, Elsevier N.Y. 1971, p 473, only magnesium silicide of these alloys leads to a yield of some interest. However, the attack of this compound gives silane transformation rates that can vary according to operating conditions. It appears that the yield is strongly linked to the size of the magnesium silicide grains, the rate of introduction of the powder of the compound, the reaction temperature and the direction of putting the reagents into contact.

According to a variant of this process, a silane yield on the order of 80% in relation to the silicon is obtained by performing the attack of the magnesium silicide by ammonium chloride in a liquid ammonia medium.

The principle of utilizing hydrolysis of magnesium silicide offers the advantage of depending on simple chemistry and producing silane whose main impurity is water which is easy to eliminate. On the other hand, the transposition of magnesium silicide hydrolysis to an industrial scale has two major economic and technical drawbacks. This initial product, whose preparation requires special equipment now applying only to the production of silane, is an expensive product. On the other hand, since obtaining good yields depends on the performance of the reaction in the presence of liquid ammonia, it is necessary to work under a pressure on the order of 6 atmospheres, then perform a very effective silane/ammonia separation.

In 1956, Chretien, Freundlich and Deschanvres, during their work on ternary alloys $Ca_3Al_6Si_2$ and $Ca_2Al_4Si_3$, noted that these acid-sensitive compounds produced, when attacked by dilute hydrochloric acid, a release of gas (silane) spontaneously flammable in the air (CR Acad, Sciences, Feb. 6, 1956, pp 784–5). The report of these laboratory experiments did not give the conditions necessary for embodying a profitable process, and they did not lead to any industrial development.

SUMMARY OF THE INVENTION

A simple process has been found using inexpensive raw materials and producing silicon hydrides with an industrial yield. Instead of using binary alloys, according to the invention an industrial ternary alloy of the formula $M^1_xM^2_ySi_z$, in which $M^1$ is a reducing metal such as aluminum or magnesium, $M^2$ is an alkali or alkaline-earth metal such as calcium easily forming a hydride, is made to react with a dilute acid selected from hydracids and orthophosphoric acid, in a concentration between 2N and 6N; the industrial ternary alloy is added in the form of a fine powder, with a granulometry at most equal to 0.40 mm, in the acid, the reaction being performed between ambient temperature and 90° C.

BRIEF DESCRIPTION OF DRAWING

The sole FIGURE is a schematic flow diagram showing a process and apparatus for practicing the present invention.

DETAILED DESCRIPTION

In the formula of the ternary alloys e.g. $Al_xSi_xCa_y$ the values x, y, z represent the percentage by weight of each element present in the alloy. While each index can theoretically vary in almost the entire range from 0 to 100%, it will be understood that practically speaking all three elements must be present in at least about 5–10% by weight.

The Al/Si/Ca alloys selected are currently available, inexpensive foundry alloys. Of the available alloys, there can be cited the alloys Al 30–38%, Si 35–45%, Ca 15–25%, which are particularly high-performing and give very good results. The preferred industrial alloy, (33% Al, 18% Ca and 40% Si) yields 1 kg of silane per 10 kg of alloy. Under the same conditions, another industrial alloy Al 11%, Si 58%, Ca 28%, the use of which is within the present invention, yields 1 kg of silane per 18 kg of alloy.

The direction of addition of the powder and acid has a decisive action on the yield of the alloy. Tests made on the alloy Al 33%/Ca 18%/Si 40% under the same conditions showed that 18 kg of alloy are necessary to produce 1 kg of silane when the acid is made to react on the powder by addition of acid to the powder; while by addition of the powder into the acid, 1 kg of silane is produced from only 10 kg of alloy. Under test conditions, the addition of the alloy powder into the stirred acid solution can be done at a rate of 4 to 8 kilograms per hour, knowing that greater delivery increases the reactivity of the system.

Of the hydracids, it is possible to choose dilute hydrofluoric, hydrochloric and orthophosphoric acids at a concentration between 2N and 6N, preferably about 3N.

The influences of the nature and concentration of the acid on the silane yield of the alloy were studied on the alloy Al 33%/Ca 18%/Si 40%, by adding the powder to the acid, all other conditions being similar. With 3N orthophosphoric acid, 1 kg of silane is obtained from 14 kg of alloy, and by the action of 3N hydrochloric acid, only 10 kg of alloy are necessary to product 1 kg of silane. N hydrochloric acid makes it possible to obtain only 1 kg of silane by reacting 125 kg of alloy, while only 16 kg and 10 kg are needed, respectively to release 1 kg of silane with 6N and 3N HCl. In relation to the alloy, the hydrochloric acid is used in relative proportions of 10 to 25 liters of acid per kilogram of powder, and under test conditions, the choice of 15 to 16 liters represents a good compromise.

The reaction of the alloy powder on the acid can be performed at ambient temperature, but it was noted that the kinetics increase with temperature and hydrochloric acid requires the reaction to be performed at a temperature of at least 50° C. To accelerate the kinetics, heating should be up to about 70° C. The maximum working temperature is limited by the boiling temperature of the solution and, in practice, to around 90° C., the metal powder being introduced at such a rate that the reaction temperature does not exceed 90° C.

It has also been found that the granulometry of the powder has an influence on the kinetics and consequently on the yield. The kinetics increases when the particle size diminishes. Foam formation is the factor limiting the particle size. The granulometry of the industrial ternary alloy powder should be at least as small as 0.40 mm. A granulometry less than 0.2 mm is well suited to the reaction. All conditions being otherwise equal, when the particle size is divided by 10, the amount of silane produced using same is multiplied by about 15.

The importance of the amount used of alloyed silicon $Si_3Al_4Ca_2$, an intermetallic compound, has been established. The higher the amount of "alloyed silicon" in the alloy—all other conditions being equivalent—the greater the yield, i.e. the mass of total products formed increases. Preferably, an alloy containing "alloyed silicon" is chosen; starting with an amount of "alloyed silicon" on the order of 20%, a notable increase in the yield of formation of silicon hydrides is noted. A variation of 20 to 30% of the amount of "alloyed silicon" can correspond to an increase of more than 30% of the total silicon hydrides formed. The influence of the amount of "alloyed silicon" is decisive for the disilane content, this content being increased by about 80%. A rise in the "alloyed silicon" content of the alloys, even 40%, can only be favorable to the formation of silicon hydrides and the advantage of using an alloy with a high "alloyed silicon" content is great, this use being limited only by the technological possibilities of production of the alloys.

The use of any industrial alloy with a base of silicon, calcium and aluminum, exhibiting in its composition the defined elements $Si_3Ca_2Al_4$ or magnesium silicon, $Mg_2Si$, an additive introduced in an amount representing at least 10% by weight of all the alloys subjected to hydrolysis and less than 50%, makes it possible to increase the yield of the process considerably. In other words, yields are improved if the industrial alloy contains the intermetallic compound $Si_3Ca_2Al_4$ or if 10–50% of $Mg_2Si$ and/or $Si_3Ca_2Al_4$ is added thereto.

The raw gas coming from the reaction zone consists of hydrogen and silicon hydride, silane $SiH_2$, disilane $Si_2H_6$, trisilane $Si_3H_8$ and polysilanes or higher silanes $Si_nH_{2n+2}$ wherein n>3.

The silicon hydrides are condensed in solid form, optionally by trapping in cooling mixtures such as ice and water, or cryogenic coolants such as liquid nitrogen. Separation by fractional evaporation under partial vacuum makes it possible to obtain three fractions, each then being subjected to a purification, for example, by the technique of preparative chromatography in gaseous phase. The first fraction corresponding to silane, $SiH_4$, is isolated by evaporation at a temperature of $-78°$ C. under a vacuum of 300 mbar, $3.10^4$ Pa.

The second fraction corresponding to disilane, i.e. consisting practically of 80% of disilane and trisilane in an amount of at least 15% and the rest being mostly silane, is separated at 0° C. under a vacuum of 500 mbar, $5.10^4$ Pa. The third fraction, corresponding to heavy higher silanes or polysilanes, $Si_nH_{2n+2}$ wherein $n \geq 3$, in particular trisilane, in a proportion of at least 75%, with the rest on the order of 22% disilane and on the order of about one percent of silane, is separated by heating at $+80°$ C. under 100 mbar, $1.10^4$ Pa.

The reaction zone is sheltered from the air and at the end of the reaction the alloy that has not reacted is neutralized. The reaction zone, its accessory parts and the fractionating zone are purged with nitrogen. The hydrogen and gas products formed in the reaction are collected after separation of the silicon hydrides and are recovered or burned after filtering.

With reference to the drawing, the process of producing silicon hydrides is carried out in a fluid-tight reactor 1 equipped with heating means such as a double water circulation device 2 closed at the upper part by a plate 3 in which are inserted in a fluid-tight manner agitator 4, pipe 5 fed with acid, and whose delivery is controlled by valve 6. Also provided are a temperature probe 7 and an alloy powder supply system 9, 10, 11. Powder 8 is directed to the reactor by fluid-tight distributing hopper 9, then pipe 10, the rate of introduction of the powder being controlled and regulated by a valve system 11. The powder is added to the acid bath 12 in a dilute concentration, with stirring. Steam and gas products escape by evacuation pipe 13 to water condenser 14. In case of excess pressure in the reactor, there is a pressure release system 15 connected to a water blast.

With respect to the gas products, hydrogen and silicon hydrides escape at the upper part of condensor 14 and after circulating in pipe 16 they are filtered in filter 17 to eliminate traces of metal powder, then passed by circuit 19 to a series of airtight cryogenic traps 19, 20 and 21 where the silicon hydrides are condensed at the temperature of liquid nitrogen. The major part of the silicon hydrides are condensed in the first trap, the last two having especially a safety role. The traps are each equipped with pressure control.

After condensation of the silicon hydrides in trap 19, the hydrogen is evacuated at the upper part of the trap by pipe 22A to circuit 23 for evacuation of the hydrogen to a combustible gas flare, or the hydrogen is collected. After going through the other traps, the uncondensables are filtered, and recovered through pipe 22B in evacuation circuit 23. Circuit 18 of filter 17 at the output of the last trap is provided in each section with opening and closing means, such as valves, making it possible to isolate each trap and to control the input and output of gas products entering there or escaping therefrom. After condensation of the silicon hydride and evacuation of the uncondensables, the cryogenic traps are then heated by outside addition of heat and put under vacuum, the temperature and vacuum being adjusted to precise values corresponding to each fractions which after fractional evaporation, is stored in a bottle before purification thereof.

The installation further comprises a nitrogen circuit 24 intented to purge and flush all the equipment; reactor, hopper, filters and various traps, after the end of the reaction. The various sections 24A, 24B, 24C and 24E are provided with valves. The equipment also comprises a vacuum pump 25 protected by cryogenic trap 26 from any possible entrainment of the silicon hydrides. The gas products, not condensed in the trap 26, are carried by pipe 22C to the hydrogen recovery circuit 23 leading e.g. to the flare. Further, the lower part of reactor 1 is connected to neutralizing tank 27 by pipe 28, and the reaction medium is emptied and neutralized in this tank.

Nonlimiting examples illustrating the invention are given below.

EXAMPLE 1

Reagents:
Alloy powder: Al 35%/Ca 18%/Si 40%;
granulometry 0.2 mm;
3.4N hydrochloric acid (12% W);
relative proportions: 15 liters of acid per kilogram of alloy;
Operating conditions:
Addition of powder to stirred acid solution;
initial temperature of reaction mixture: 50° C.;
equilibrium temperature of reaction: 75° C.;
Rate of addition of alloy 8 kg/hour.
The raw gas leaving the reaction has the volume composition:
hydrogen: 65%
inorganic hydrides: 35%
The fractional evaporation under partial vacuum provides three fractions of the following mass compositions

| 1st fraction | | |
|---|---|---|
| ($-78°$ C., $3.10^4$ Pa.) | $SiH_4$ | 97% |
| | $Si_2H_6$ | 2.5% |
| | Other impurities | 0.5% |
| 2nd fraction: | | |
| (0° C., $5.10^4$ Pa.) | $SiH_4$ | 4.5% |
| | $Si_2H_6$ | 79% |
| | $Si_3H_8$ | 16% |
| | other impurities | 0.5% |
| 3rd fraction: | | |
| (80° C. $1.10^4$ Pa.) | $SiH_4$ | 1.5% |
| | $Si_2H_6$ | 22% |
| | $Si_nH_{2n+2}$ | 76.5% |

Products obtained after separation and purification: 70 kg of alloy and 1100 liters of hydrochloric acid produce:
3.3 kg of silane $SiH_4$
1 kg of disilane
and 1.3 kg of polysilanes or higher silanes.

The first two fractions are treated to obtain silane and disilane of electronic quality.

The third fraction is useful as a replacement for the silane used in the process of frosting light bulbs by the dry method.

The silicon hydrides can also be used in other sectors such as photovoltaic cells and photocopier drums.

EXAMPLE 2

Reagents:
Alloy powder: Al 31.9%/Ca 23.5%/Si 38.2%/Fe 2.9
Alloyed silicon proportion: 32.9%
Granulometry: 0.4 millimeter;
Hydrochloric acid: 3.N (12% W);
Relative proportions: 16 liters of acid per kilogram of alloy;
Operating conditions
Addition of powder into the stirred acid solution;
Initial temperature of reaction medium: 50%
Equilibrium temperature of reaction: 80°–90° C.
Rate of addition of alloy: 8 kg/hour
The raw gas at the output of the reactor has the following volume composition:
hydrogen: about 35%
inorganic hydrides: 65%
Fractional evaporation under partial vacuum according to the same conditions as the preceding example provides three fractions from an initial 4 kg of alloy:

| 1st fraction ($-78°$ C., $3.10^4$ Pa) | 325 g |
|---|---|
| 2nd fraction (0° C., $5.10^4$ Pa) | 154 g |
| 3rd fraction (80° C., $1.10^4$ Pa) | 165 g |
| | 671 g |

EXAMPLE 3

Reagents:
Alloy powder: Al 30.9%/Ca 21%/Si 42%/Fe 3.1%
Proportion of alloyed silicon: 23.1%
Granulometry: 0.2 millimeter
Hydrochloric acid 3.4N (12% W)
Relative proportions: 16 liters of acid per kilogram of alloy.
Operating conditions.
Addition of powder on stirred acid solution;
Initial temperature of reaction mixture: 50° C.;
Equilibrium temperature of reaction: 80°–90° C.;
Rate of addition of alloy: 8 kg/hour;
The raw gas coming from the reactor has the following volume composition:
hydrogen: about 50%
inorganic hydrides: 50%
Fractional evaporation under partial vacuum, according to the conditions of this example, provides three fractions from an initial 4 kg of alloy:

| 1st fraction ($-78°$ C., $3 \times 10^4$ Pa) | 273 g |
|---|---|
| 2nd fraction (0° C., $5 \times 10^4$ Pa) | 109 g |
| 3rd fraction (80° C., $1 \times 10^4$ Pa) | 126 g |
| | 508 g |

Typical analysis of the three fractions at the production output, without purification, for the two preceding examples is the following:

| | Fraction 1 gas phase | Fraction 2 gas phase | Fraction 2 gas phase | Fraction 3 gas phase |
|---|---|---|---|---|
| Lights | 0.5 | 0.15 | 1 | 0.09 |
| $SiH_4$ | 98.75 | 42.6 | 3.52 | 20.3 |
| $PH_3$ | 0.04 | 0.23 | 0.043 | 0.033 |
| $H_2S$ | 0.06 | 1 | 0.18 | 0.179 |
| $AsH_3$ | | | 0.006 | 0.006 |
| $SiH_3OSiH_3$ | 0.03 | 0.7 | 5.86 | 0.69 |
| $Si_2H_6$ | 0.56 | 52.3 | 85.8 | 68.75 |
| $SiH_3OSiH_2OSiH_3$ | | 0.11 | 0.096 | 0.01 |
| $Si_2H_5OSiH_3$ | | 0.015 | 0.248 | 0.115 |
| $Si_3H_8$ | 0.048 | 0.91 | 3.37 | 9.83 |
| $Si_4H_{10}$ | | 0.026 | 0.018 | |

It is to be understood that the present invention is not limited to the embodiments disclosed which are illustratively offered and that modifications may be made without departing from the invention.

We claim:

1. Process for producing silicon hydride by acid hydrolysis of an industrial ternary alloy of the formula $M^1_xM^2_ySi_z$ in which $M^1$ is aluminum or magnesium, $M_2$ is calcium, and wherein each of x, y, and z is at least 10% and containing at least 20% alloyed silicon, comprising: reacting said alloy with a dilute hydrofluoric, hydrochloric or orthophosphoric acid, in a concentration between 2N and 6N, by adding into the acid the ternary alloy in the form of a fine powder of a granulometry at least as small as 0.4 mm, the reaction being conducted at a temperature of at least 50° C., the ternary metal powder being introduced to the acid at a rate such that the reaction temperature does not exceed 90° C.

2. Process for producing silicon hydrides as in claim 1, wherein the industrial alloy is represented by the formula $Al_xSi_zCa_y$.

3. Process for producing silicon hydrides as in claim 1, wherein the industrial alloy is 30–38%, Ca 15–25%, Si 35–45%.

4. Process for producing silicon hydrides as in claim 1 wherein silane, disilane, trisilane and polysilanes are prepared and condensed in solid form, then separated by fractional evaporation under partial vacuum, each fraction then being subjected to a purification.

5. Process for producing silicon hydrides as in claim 4, wherein the first fraction corresponding to silane is isolated by evaporation at −78° C. under $3.10^7$ pascal, the second fraction corresponding to disilane is isolated by evaporation at 0° C. under $5.10^4$ pascal and the third fraction corresponding to polysilanes $Si_nH_{2n+2}$ wherein $n \geq 3$ is separated at +80° C. under $1.10^4$ pascal.

6. Process for producing silicon hydrides as in claim 1 wherein the reaction zone is shielded from contact with air, at the end of reaction the alloy that has not reacted is neutralized, and the reaction zone, all its accessory parts and the fractionating zone are purged with nitrogen.

7. Process for producing silicon hydrides as in claim 2 wherein silane, disilane, trisilane and polysilanes are prepared and condensed in solid form, then separated by fractional evaporation under partial vacuum, each fraction then being subjected to a purification.

8. Process for producing silicon hydrides as in claim 3 wherein silane, disilane, trisilane and polysilanes are prepared and condensed in solid form, then separated by fractional evaporation under partial vacuum, each fraction then being subjected to a purification.

9. Process for producing silicon hydrides as in claim 1 wherein silane, disilane, trisilane and polysilanes are prepared and condensed in solid form, then separated by fractional evaporation under partial vacuum, each fraction then being subjected to a purification.

10. Process for producing silicon hydrides as in claim 7, wherein the first fraction corresponding to silane is isolated by evaporation at −78° C. under $3.10^7$ pascal, the second fraction corresponding to disilane is isolated by evaporation at 0° C. under $5.10^4$ pascal and the third fraction corresponding to polysilanes $Si_nH_{2n+2}$ wherein $n \geq 3$ is separated at +80° C. under $1.10^4$ pascal.

11. Process for producing silicon hydrides as in claim 8, wherein the first fraction corresponding to silane is isolated by evaporation at −78° C. under $3.10^7$ pascal, the second fraction corresponding to disilane is isolated by evaporation at 0° C. under $5.10^4$ pascal and the third fraction corresponding to polysilanes $Si_nH_{2n+2}$ wherein $n \geq 3$ is separated at +80° C. under $1.10^4$ pascal.

12. Process for producing silicon hydrides as in claim 7 wherein the reaction zone is shielded from contact with air, at the end of reaction the alloy that has not reacted is neutralized, and the reaction zone, all its accessory parts and the fractionating zone are purged with nitrogen.

13. Process for producing silicon hydrides as in claim 10 wherein the reaction zone is shielded from contact with air, at the end of reaction the alloy that has not reacted is neutralized, and the reaction zone, all its accessory parts and the fractionating zone are purged with nitrogen.

14. Process for producing silicon hydride by acid hydrolysis of ternary silicon alloys of the formula $M^1_xSi_zCa$, comprising:
   providing a ternary alloy of the above formula in which $M_1$ is aluminum or magnesium and wherein each of x, y and z is at least 10%, in the form of a fine powder of granulometry at least as small as 0.4 mm;
   adding said finely powdered ternary alloy to a dilute acid selected from the group consisting of hydrochloric acid, hydrofluoric acid and orthophosphoric acid at a concentration between 2N and 6N, at a temperature between 50° and 90° C., and thereby reacting said ternary alloy with said acid to produce silicon hydride.

* * * * *